Aug. 24, 1965    L. A. ROSENBLUM    3,201,997
APPARATUS FOR BALANCING WHEEL ASSEMBLIES
Filed May 10, 1963    3 Sheets-Sheet 1

INVENTOR.
LESTER A. ROSENBLUM
BY
Blair & Buckles
ATTORNEYS

Aug. 24, 1965    L. A. ROSENBLUM    3,201,997
APPARATUS FOR BALANCING WHEEL ASSEMBLIES
Filed May 10, 1963    3 Sheets-Sheet 2

INVENTOR.
LESTER A. ROSENBLUM
BY
Blair E. Buckles
ATTORNEYS

Aug. 24, 1965 L. A. ROSENBLUM 3,201,997
APPARATUS FOR BALANCING WHEEL ASSEMBLIES
Filed May 10, 1963 3 Sheets-Sheet 3
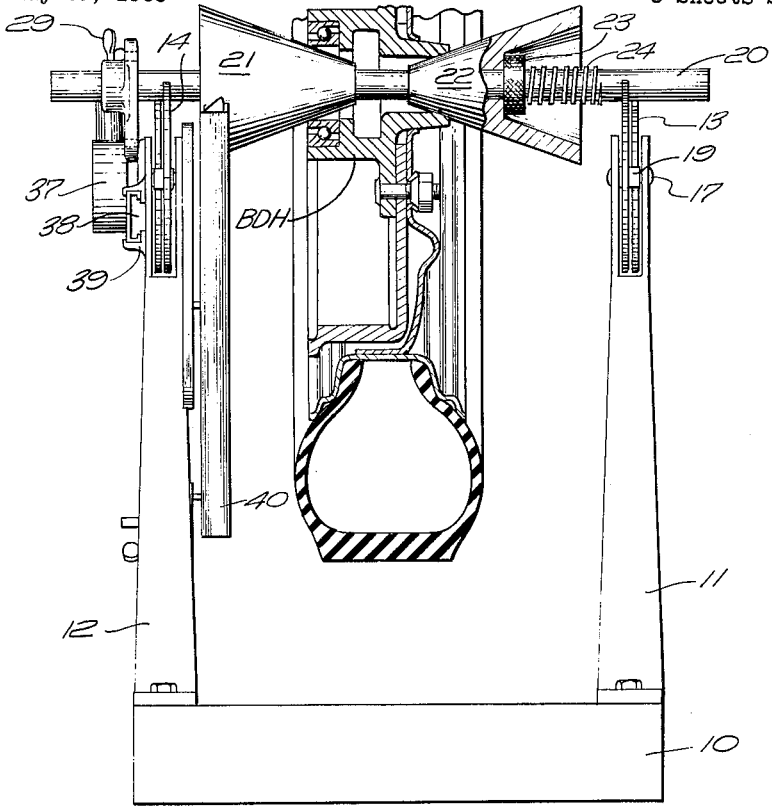
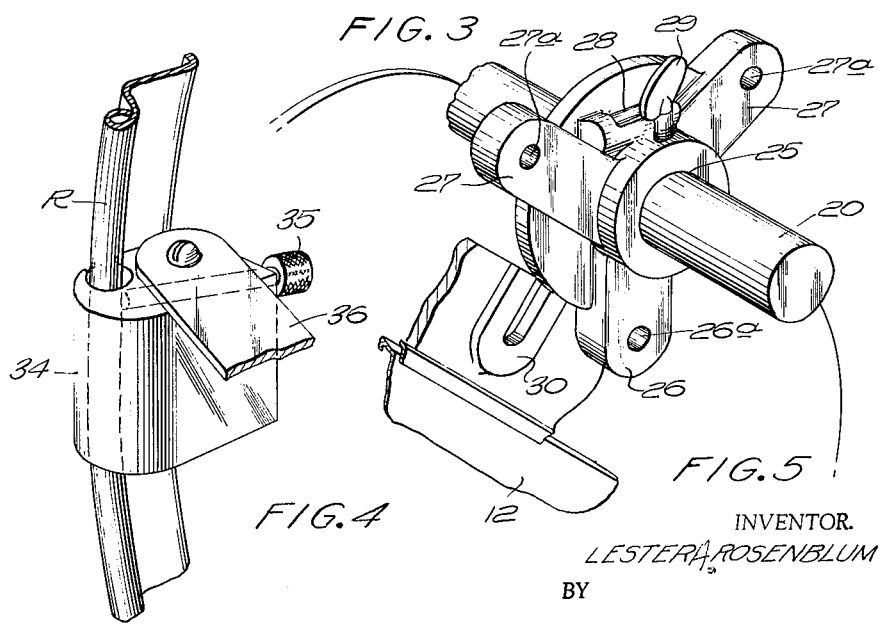
INVENTOR.
LESTER A. ROSENBLUM
BY
Blair & Buckles
ATTORNEYS United States Patent Office 3,201,997
Patented Aug. 24, 1965

3,201,997
APPARATUS FOR BALANCING WHEEL ASSEMBLIES
Lester A. Rosenblum, 56 Freedom Drive, Franklin, N.H.
Filed May 10, 1963, Ser. No. 279,488
11 Claims. (Cl. 73—480)

This invention relates to wheel assembly balancing, and more particularly to apparatus for determining the unbalanced condition of a wheel assembly, and the positions at which may be applied weights for offsetting the unbalanced condition.

The invention aims to provide an improved apparatus for quick, easy, and accurate determination of the location of and measurement of the excess weight of the heavy spot on a wheel assembly, and plotting of the points where the counter balancing weights are to be applied.

A further invention object is to provide a simply designed, durably constructed, and easily operated portable apparatus or device for balancing a wheel assembly.

The invention will be better understood from a consideration of the following specification, taken in conjunction with the accompanying drawings, in which:

FIG. 3 is a side elevation of the wheel balancer as applied to a wheel, drum and tire assembly;

FIG. 4 is an enlarged view in perspective of elements of the heavy spot position weighing unit of the device;

FIG. 5 is a similarly enlarged view in perspective of the heavy spot position determining means of the device.

In the preferred embodiment of the drawings the wheel assembly balancing device comprises a base or stand 10 which may be movably supported on casters or the like, and a pair of similar, opposed supporting legs or uprights 11, 12, rigidly mounted at the opposite ends of the stand. The uprights are vertically slotted at their upper ends to receive each a pair of discs 13, 13, 14, 14, which discs are mounted in the slots in horizontally spaced, overlapping relationship such that their intersecting upper margins define notches or V's, FIG. 2.

Figure 6:
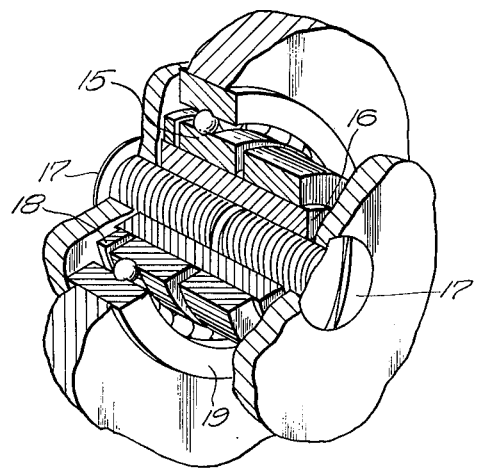
FIG. 6 is an enlarged view in perspective of one of the disc mounting assemblies of the device.

In accordance with the invention, the discs 13, 14 are centrally apertured to receive ball bearing assemblies 15, FIG. 6, in which the engagement of the balls with the races is deliberately made loose, whereby the bearing assemblies and with them the discs are permitted some freedom of movement about both the horizontal and the vertical axis. The bearing assemblies 15 are rotatably mounted in turn on axles 16 received in the slots in the uprights and held there by screw or the like fastenings 17 passed through openings in the uprights and threaded into the ends of the axles from the opposite sides of the uprights. The discs are staggered in the upright slots by oppositely or reversely mounting on the axles of the disc pairs a washer 18 and a spacer 19, the spacer having a lateral extent greater than that of the washer as calculated to produce the desired offset of the discs of the pair.

The discs 13, 14, will be understood to be carefully ground at their outer peripheries to be perfectly round and also to uniformly parallel at their peripheral margins the transverse axes of the discs, and further to be balanced to render the wheel mounting system free from gravitational influence.

A wheel supporting spindle or arbor 20 is removably positioned or seated in the aforesaid notches or V's defined by, and so as to turn freely with, the independently rotating discs 13, 14. The surface of the arbor 20 is also ground and polished to a perfectly round, smooth condition whereby it will and by its own weight effect the alignment therewith of the discs as permitted by their above described loose mounting.

Under the invention, then, the wheel assembly suspension system comprising the discs 13, 14 and arbor 20, being substantially frictionless and balanced as just indicated, will assume any random position of orientation when a balanced wheel assembly is applied thereto, and will permit an unbalanced wheel assembly applied thereto to orient itself by gravity, and more particularly to come to rest with the heavy spot directly underlying the axis of suspension, without exerting any gravity influence on that.

The invention device comprises further a duplicate pair of balanced cones 21, 22 slidably received on the arbor. The cones 21, 22 may alternately be faced oppositely inward for engaging in the smaller openings of a drum, wheel, and tire assembly, B.D.H. FIG. 2 or be oriented with one cone faced inwardly and the other outwardly to engage respectively the larger opening of and the opposite face of a wheel and tire assembly W, FIG. 1; and they are securable in either relationship by a stop (not shown) on one side and a lock nut 23, turned up on arbor threads 24, FIG. 2, at the other side of the cone assembly.

It will be understood that when an unbalanced wheel is mounted on the arbor 20 the center point of the excess weight of the wheel assembly, known as the heavy spot, will swing rapidly to, and come to rest at, a bottom position wherein it vertically underlies the arbor. The function of the wheel balancer is first to fix or determine the radial location of the heavy spot on the wheel assembly, which may or may not in the rest position coincide with the vertical center line of the uprights 11, 12 according as the flooor on which the base 10 stands is or is not perfectly level, or horizontal.

To accomplish this there is provided a heavy spot position determining means 25 rotatably mounted on the arbor 20 outside one of the uprights and comprising a downwardly extending arm 26, and in the illustrated form also a pair of upwardly extending arms 27, 27 equidistantly spaced radially from the downwardly extending arm 26. The position determining means 25 comprises further a spirit level 28 positioned normal or at right angles to the arm 26 so as to center the bubble when that arm is exactly vertical.

Under the invention the exact position of the heavy spot of the wheel assembly, which generally will not coincide with the center line of the uprights as exaggeratedly shown for the sake of illustration in FIG. 5, is determined simply by rotating member 25 on the arbor 20 until the bubble is centered in level 28, and the arm 26 is thus lined up with the heavy spot. The position determining means 25 is then fixed relative to arbor 20 as by turning up clamp screw 29 thereagainst, and the arbor and wheel assembly are then rotated to bring the arm 26, and more particularly the passage 26a formed centrally therethrough, into registry with a mating passage or slot 30, FIG. 5, formed at the vertical center line of the upright 12 behind the arm 26. The parts are then secured in the lined-up position by inserting a locking pin 31, FIG. 1 into the apertures 26a, 30 which will be understood to be of a proportion closely fitting the pin 31 and of a depth engaging that over a sufficient length to rigidly anchor the parts in the described relation.

The uprights 11, 12 are formed at their vertical center lines with guide slots 32, 33 which are now seen to be lined up with the heavy spot of the wheel assembly. To fix or show the spot the operator simply inserts a pencil or other marking means through the guide slot and marks the spot in desired manner.

Under one mode of practising the invention the heavy spot is next weighed by rotating the heavy spot to a readily accessible position and then attaching to the wheel rim a gauge contactor comprising a block 34, FIG. 4, removably secured by a clamp screw 35 and having a flat upper face on which is pivotally supported a horizontally extending arm 36, which may be positioned to overlie a weight gauge 37 which is compensated for the weight of the contactor and carried on an arm 38 mounted for horizontal shifting in a slide 39 on upright 12. The gauge 37 conveniently is positioned exactly at the correct lateral distance from the vertical centerline (which is one half the specified wheel diameter) by providing suitable indicia (not shown) on the arm 38, which indicia may be matched against a fixed reference mark or pointer on the upright 12.

The device is next manipulated to locate a pair of spots at which may be mounted counterbalancing weights calculated to offset or counterbalance the out of balance condition of the wheel assembly. These counterbalancing spots will under the invention be located at the other side of the wheel assembly from and equidistant from the heavy spot. The locating may be done under one procedure by simply bringing the left and right arms 27, FIG. 4, successively into registry of their openings 27a with the upright opening 30, and marking the two spots by successively inserting a pencil or the like through a guide slot 33, in the similar manner as hereinbefore described for the marking of the heavy spot.

Under the preferred mode of practicing the invention, this locating of the counter balancing spots may be accomplished even more simply and easily than as just described, and coincident with, and without the necessity of wheel manipulation beyond that required for, the locating of the heavy spot. To that end there are provided a pair of arms 40, 41 pivotally supported at their lower ends on a T member 42 slidably engaged in guide slot 33, and being supported intermediate their ends on pivots 43, 44, FIG. 2, slidably engaged in guide slots 45, 46, which are curved about a radius whereby the arms may be reciprocated between the solid line and dashed line positions shown. The described mounting of the arms 40, 41 is to permit their shifting between a non-use or rest position of withdrawal behind the upright 12 and an extended or operative position in which the upper ends of the arms are positioned opposite the wheel rim, and in this to control or order the moving of the arms such that the outer extremities thereof are, in the outer or operating portion of their inward-outward movement, held to the same attitude or inclination.

Figure 1:
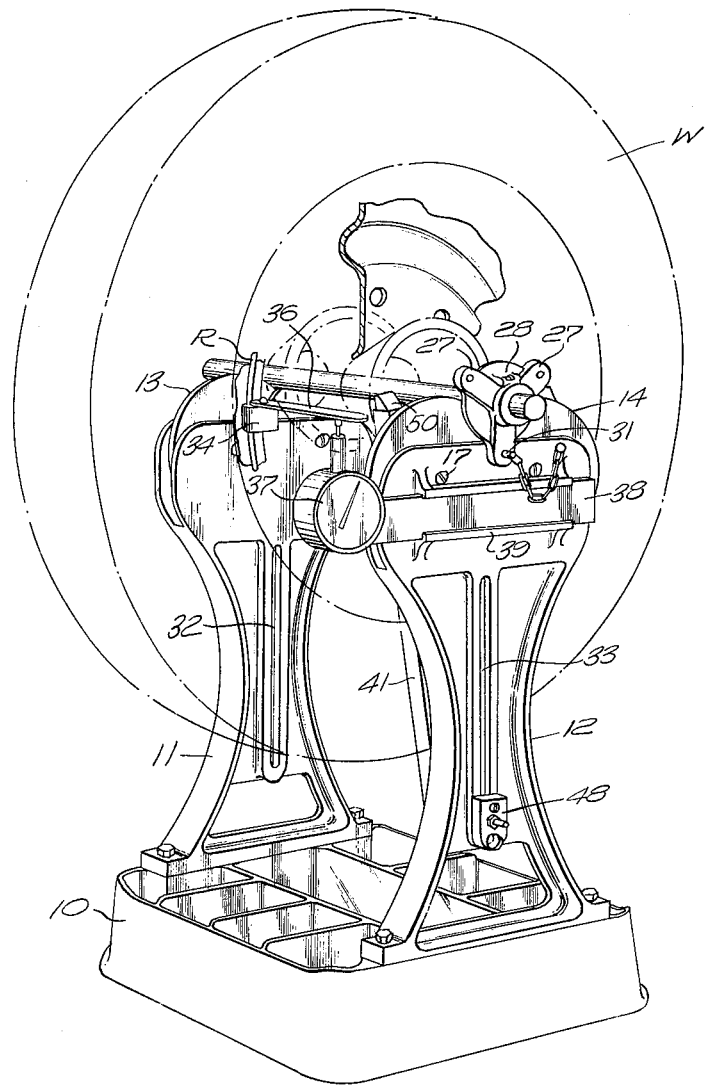
FIG. 1 is a perspective view of the wheel balancing device as applied to a wheel and tire assembly, and shown as set up for weighing the heavy spot on the wheel.
Figure 2:
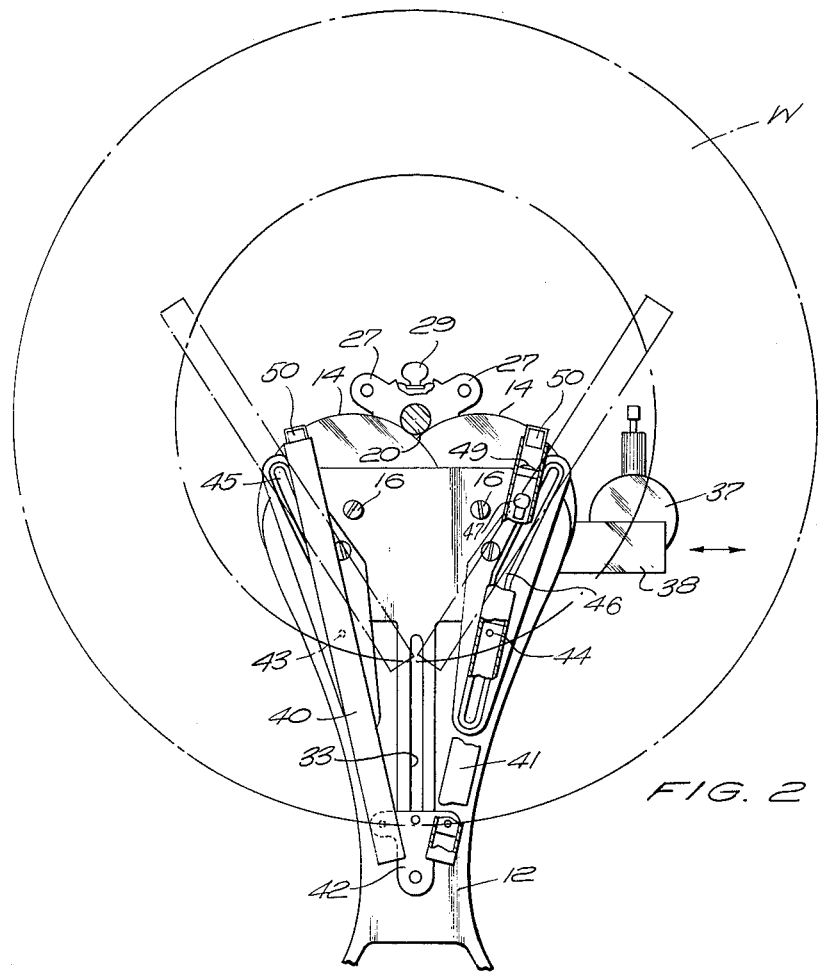
FIG. 2 is an elevation view of the rear side of the front upright of the device.

In accordance with the invention the arms 40, 41 are provided each with means such as lamp 47 which may be supplied by a battery (not shown) and controlled by a switch 48, FIG. 1, together with a lens 49 for producing and directing a beam of light coaxially with the arms. The arms 40, 41 are provided further with mirrors 50 angled at about 45° to deflect the light beams at about right angles to the arms towards the wheel assembly and to produce light spots on the wheel rim.

It will be understood that the described arrangement of the arms is such as to maintain between the light spots the same constant included angle and thus to triangulate the different size wheel assemblies with the light spots being always equidistant from the arbor 20 and from the rim R at the heavy spot.

In the operation of the arms 40, 41 for marking the spots on the wheel to which counter balancing weights are to be applied, the lamps 47 are turned on by the switch 48, and the arms are then extended the amount necessary to bring the light spots to the edge of the rim, whereupon they may be marked with a pencil or the like.

I claim:

1. A portable device for determining the unbalance of a wheel assembly comprising means comprising an arbor rotatably mounting the wheel assembly, means comprising a pair of uprights for supporting the arbor at opposite sides of the wheel assembly in balance and free from gravity influence whereby the heavy spot of the unbalanced wheel assembly will swing automatically to rest vertically below the arbor, means associated with said uprights for accurately guiding means for marking the heavy spot on the wheel assembly, means for determining the position of the heavy spot relative to the uprights whereby upon said determining the wheel assembly may be swung to bring said heavy spot into registry with said guide means and the operator may utilize said guiding means to mark said heavy spot, a weight gauge fixed on the device, a guage contactor mountable on the rim of said wheel assembly and adapted to transmit to said gauge the excess weight of said heavy spot, and means for locating on said wheel assembly a pair of counter balancing spots equidistant from said heavy spot.

2. The device of claim 1 wherein the means for determining the heavy spot position comprises a member rotatably mounted on the arbor, a level fixed to said member, means for clamping the member to the arbor when the wheel assembly has come to rest and with the level in the horizontal position and means carried by said member and extending downwardly at right angles to the level and in line with the heavy spot, said downwardly extending means representing the position of the heavy spot in relation to the position of the upright.

3. The device of claim 2 and means associated with said position relating means for momentarily locking the wheel assembly with said heavy spot in registry with said upright guide means.

4. The device of claim 3 wherein the downwardly extending means carried by said member comprises an arm having a passage therethrough, and wherein the associated locking means comprises a mating passage through the upright and a pin removably insertible in said passages.

5. The device of claim 1, wherein said guide means is a slot in the upright and through which may be inserted a pencil for marking the heavy spot.

6. The device of claim 1 wherein the weight gauge is mounted on an arm, and the upright has a lateral slide receiving said arm whereby the gauge position may be adjusted to different sizes of wheel assembly.

7. The device of claim 1 wherein the contactor comprises a clamp adapted to be releasably fastened to the rim of the wheel, and an arm pivotally mounted on said clamp to extend laterally outward to and be positioned over the weight gauge.

8. The device of claim 1 wherein the counterbalancing spot locating means comprises a pair of arms fixed on said position determining means, said arms oriented equidistant from said downwardly directed means and adapted to be successively brought into spot mark guiding relation to said upright.

9. The device of claim 1 wherein said counter balancing spot locating means comprises a pair of arms mounted on said upright to project equidistantly from said downwardly projecting means and to be extensible to triangulate different sizes of wheel assembly.

10. The device of claim 9 wherein said arms mount spot indicating means comprising light sources in and aimed in parallelism with the arms, and mirrors carried by said arms for bending the light beams to impinge on the wheel assembly.

11. The device of claim 1 wherein the mounting means comprises a pair of duplicate, balanced cones slidable on the arbor and alternatively engageable both face-to-face in smaller openings of a drum, wheel and tire assembly, and face-to-back in the larger opening of and against the opposite face of a wheel and tire assembly.

References Cited by the Examiner

UNITED STATES PATENTS

| 1,651,272 | 11/27 | Hopgood | 73—480 |
| 1,744,431 | 1/30 | Wood | 73—480 |
| 1,977,297 | 10/34 | Weaver | 73—480 |
| 1,995,061 | 3/35 | Hanford | 73—480 |
| 2,752,788 | 7/56 | La Penta | 73—480 |

RICHARD C. QUEISSER, *Primary Examiner.*

JAMES J. GILL, *Examiner.*